(12) United States Patent
Ancel

(10) Patent No.: US 6,812,849 B1
(45) Date of Patent: Nov. 2, 2004

(54) LOADING DOCK TRAFFIC AUTOMATION

(76) Inventor: Thomas A. Ancel, 5004 Winona Ave., St. Louis, MO (US) 63125-4500

( * ) Notice: Subject to any disclaimer, the term of this patent is extended or adjusted under 35 U.S.C. 154(b) by 97 days.

(21) Appl. No.: 10/023,030

(22) Filed: Feb. 19, 2002

Related U.S. Application Data

(60) Provisional application No. 60/254,947, filed on Dec. 12, 2000.

(51) Int. Cl.[7] .............................................. G08B 21/00
(52) U.S. Cl. .................... 340/686.1; 340/540; 340/500; 414/401
(58) Field of Search .............................. 340/686.1, 687, 340/540, 545.1, 547, 545.2, 545.3, 500, 521, 507, 572.1; 414/401, 396, 584; 410/7, 18

(56) References Cited

U.S. PATENT DOCUMENTS

| | | | | |
|---|---|---|---|---|
| 4,818,170 A | * | 4/1989 | Fisher et al. ................. | 414/401 |
| 4,843,373 A | * | 6/1989 | Trickle et al. .............. | 340/540 |
| 4,973,016 A | * | 11/1990 | Hertenstein .............. | 248/282.1 |
| 5,047,748 A | * | 9/1991 | Trickle ........................ | 340/542 |
| 5,168,267 A | * | 12/1992 | Trickle ........................ | 340/988 |
| 5,453,735 A | * | 9/1995 | Hahn ........................ | 340/687 |
| 5,709,458 A | * | 1/1998 | Metz ........................... | 362/96 |
| 5,831,540 A | * | 11/1998 | Sullivan et al. ............. | 340/679 |
| 6,329,931 B1 | * | 12/2001 | Gunton ........................ | 340/933 |
| 6,634,139 B1 | * | 10/2003 | Metz .............................. | 49/13 |

* cited by examiner

*Primary Examiner*—Nina Tong
(74) *Attorney, Agent, or Firm*—Henry W. Cummings

(57) ABSTRACT

The loading dock traffic automation and inventory control system of the present invention automates the loading dock area by controlling a truck control notification automation system, traffic signal dock lights, loading dock spot light, loading dock fan and dock leveler. The manually operated control panel is energized or de-energized with full automation by the movement of the overhead dock door. The device includes a control panel enclosure mounted on the interior wall of the building next to the loading dock door. One control panel enclosure can service one or two loading dock doors.

36 Claims, 9 Drawing Sheets

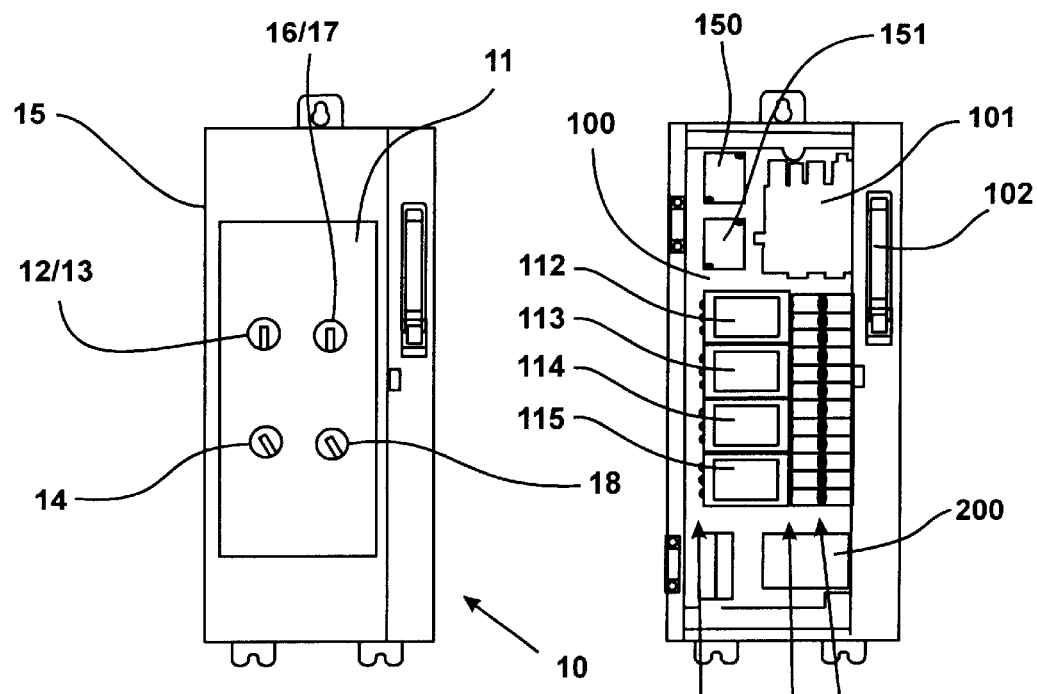
Fig. 5A
Fig. 5B
Fig. 5C
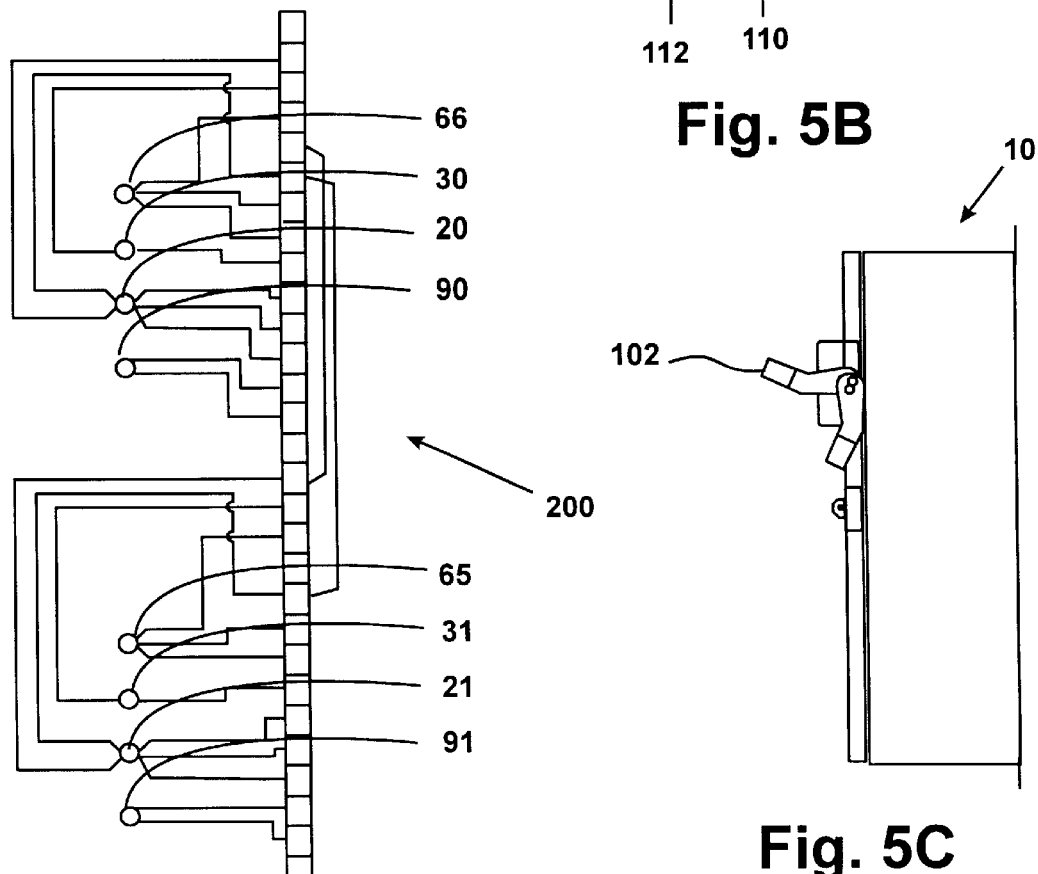
Fig. 5D

LOADING DOCK TRAFFIC AUTOMATION

This application claims 119(e) benefit of Ser. No. 60/254,947 filed Dec. 12, 2000.

This invention concept also includes sophisticated electronic means for programming the system for various modes of operation.

U.S. Pat. No. 5,453,735 discloses a loading dock signal and control system. This concept comprises traffic control lights, sensing devices, and a releaseable locking device for preventing a truck from leaving the dock prior to the completion of the loading or unloading activity. Such a device is expensive to install and maintain.

III SUMMARY OF THE INVENTION

A. OBJECTS OF THE INVENTION

One object of the present invention is to provide a means to automate loading dock activities including spot lights, ventilation fans, truck traffic control lights, and dock levelers.

Another object of the present invention is to provide means to automate inventory control systems.

Other objects of the present invention will become apparent from the following description and drawings.

B. SUMMARY

The present invention comprises a loading dock traffic and inventory control system which includes a truck control notification automation system. The truck control notification automation system reads a sensor electrically in the terminal strip located in the loading dock traffic and inventory control system panel. This tracking and additional safety device accompanies the traffic signal dock lights without the expense of a truck restraint. The truck control notification automation system is integrated and designed in the loading dock automatic and manual control system circuitry. The device design allows for an automatic signal to be read from the sensor as soon as the dock door is opened. The device design also allows for the automatic signal to be read from the sensor as soon as the dock door is closed. The sensor located on the building will read when a truck has backed up to the dock door and therefore signals to the truck control notification automation system when a truck approaches within a specific distance of sensing zone and electrically responds inside and outside the building. Dock employees inside the building are notified when a truck has back up to the dock by warning devices. The truck control notification automation system will immediately respond if the truck pre-maturely pulls away from the dock before loading or unloading is complete and dock door is not closed. The truck control notification automation system signals and alerts the truck driver with a warning beacon strobe located in the cab of the truck, warning beacon strobe located on the truck, the truck horn is activated, the transmission of the truck is locked, the brakes of the truck are locked, an independent signal warning device in front of the truck is activated, the truck driver is notified on his truck radio, the truck driver is notified on his phone, pager, radio or other communication devices, the audio alarm inside the cab of the truck is activated. The dock attendant inside the truck trailer is notified by a safety alarm light inside the truck trailer, audio alarm inside the truck trailer, beacon alarm strobe on the forklift, audio alarm on the forklift, forklift driver is notified on his phone, pager or radio or other communication devices. As the loading dock door is lowered the truck control notification automation system automatically changes to free to depart alert and alarm signal. The computer central station that controls the computer traffic database will notify the truck driver when he or she is free to depart. The departure notification to the truck driver will be received by truck driver on his or her radio, phone, pager, palm pilot, laptop, beacon located in the cab of the truck, signal light in front of the truck.

The loading dock traffic automation and inventory control system of the present invention automates the loading dock area by controlling a truck control notification automation system, traffic signal dock lights, loading dock spot light, loading dock fan and dock leveler. The manually operated control panel is energized or de-energized with full automation by the movement of the overhead dock door. The device includes a control panel enclosure mounted on the interior wall of the building next to the loading dock door. One control panel enclosure can service one or two loading dock doors. The selector switches for the dock leveler, loading dock fan and loading dock spot light are inoperable when the loading dock door is in the down and closed position. As the loading dock door is raised, a sensing means is triggered and activated, therefore energizing the selector switches located in the control panel enclosure for the dock leveler, loading dock fan and loading dock spot light. As the loading dock door is raised the inside traffic signal dock lights automatically change from red to green and the outside traffic signal dock lights automatically change from green to red. As the loading dock door is raised the truck control notification automation system automatically updates the computer traffic database, bar code scans the truck, activates (RFID) radio frequency identification, activates (SAW) surface acoustic wave technology while changing to alert and alarm not to depart. All selector switches are operable when the loading dock door is raised. If the loading dock door is lowered when the switches are in the on energized position, all selector switches become inoperable again and all components turn off that are associated with each specific selector switch, thus saving energy. As the loading dock door is lowered the inside traffic signal dock lights automatically change from green to red and the outside traffic signal dock lights automatically change from red to green. As the loading dock door is lowered the truck control notification automation system updates the computer traffic database, bar code scans the truck, activates (RFID) radio frequency identification, activates (SAW) surface acoustic wave technology while automatically changing to free to depart alert and alarm signal.

IV. THE DRAWINGS

FIG. 5A is a frontal view of the 208 Volt, 3 phase loading dock traffic automation and inventory control panel system of the present invention showing the front door closed.

FIG. 5B is a frontal view of the 208 Volt, 3 phase loading dock traffic automation and inventory control panel system of the present invention showing the front door open.

FIG. 5C is a side view of the 208 Volt, 3 phase loading dock traffic automation and inventory control panel system of the present invention.

FIG. 5D is an illustration of the terminal strip installed in the 208 Volt, 3 phase embodiment of the present invention.

DESCRIPTION OF PREFERRED EMBODIMENTS

Figure 1:
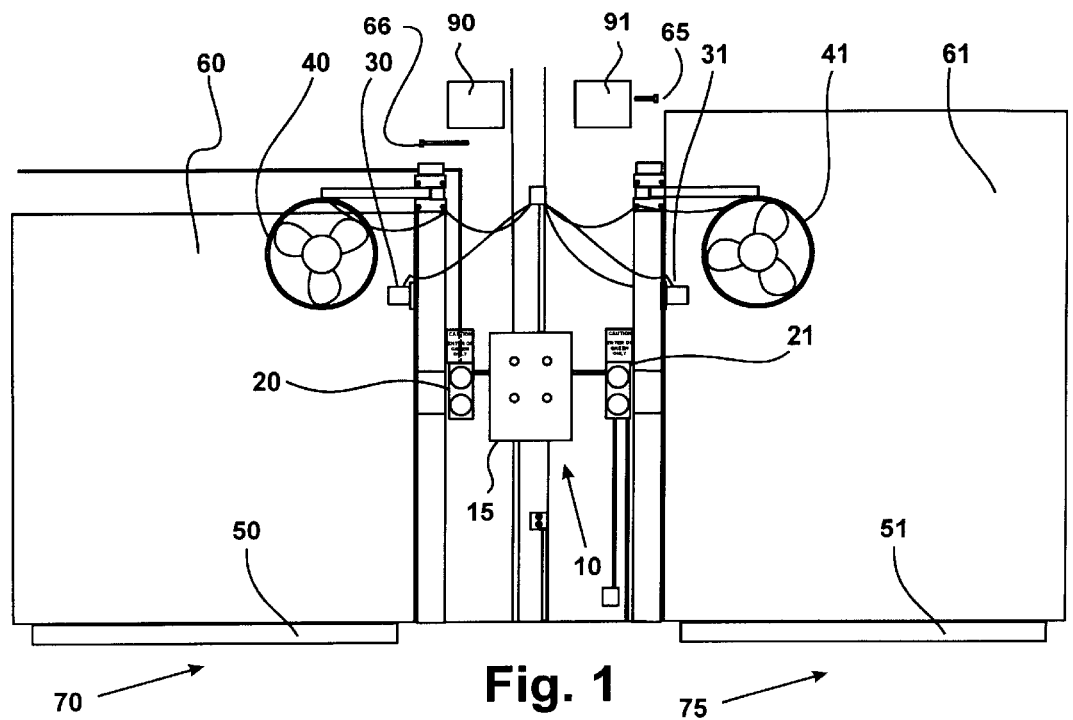
FIG. 1 is a inside frontal view of the 480 Volt, 3 phase loading dock traffic automation and inventory control panel system, traffic signal dock lights, loading dock spot light, loading dock fans mounting and wiring detail of the present invention.
Figure 2:
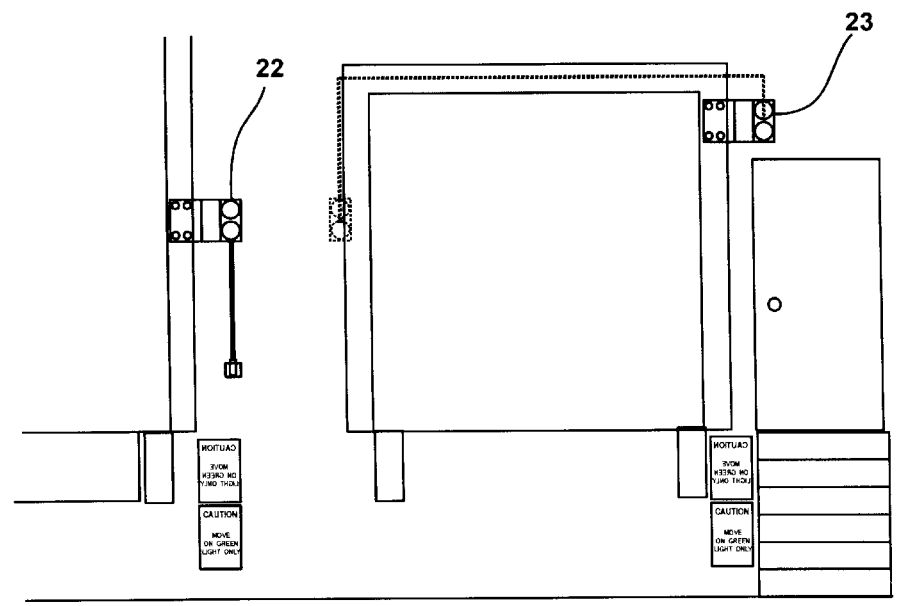
FIG. 2 is an outside frontal view of the loading dock traffic signal dock lights and traffic signal dock light bracket mounted to the door jamb of the present invention. This figure is common to all embodiments of the present invention.
Figure 3A:
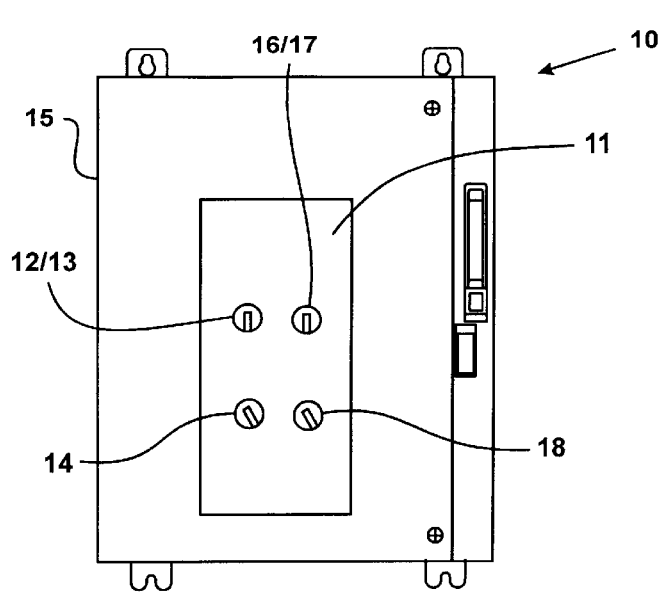
FIG. 3A is a frontal view of the 480 Volt, 3 phase loading dock traffic automation and inventory control panel system of the present invention showing the front door closed.
Figure 3C:
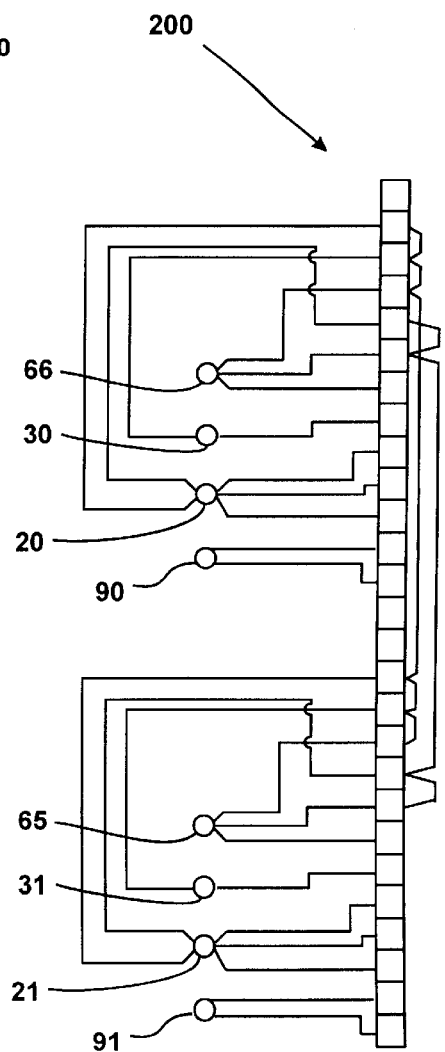
FIG. 3C is an illustration of the terminal strip installed in the 480 Volt, 3 phase embodiment of the present invention.
Figure 3B:
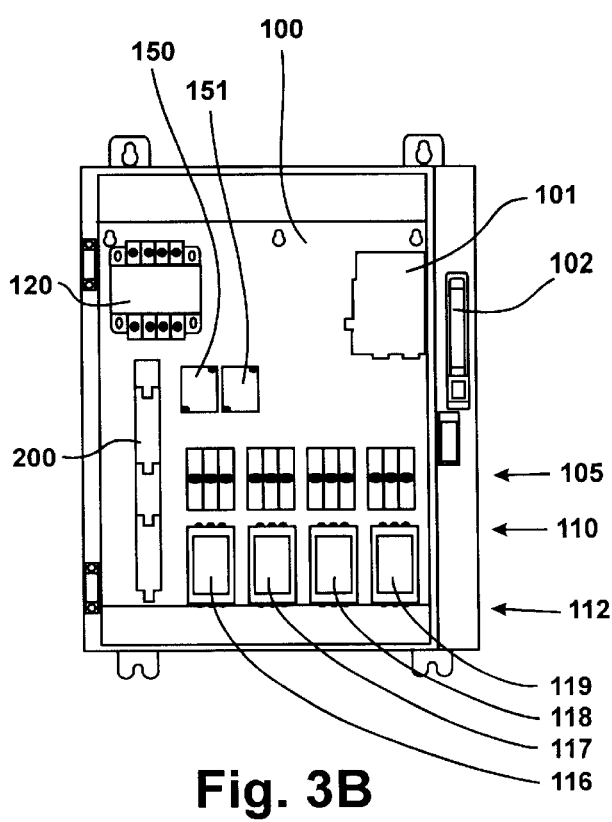
FIG. 3B is a frontal view of the 480 Volt, 3 phase loading dock traffic automation and inventory control panel system of the present invention showing the front door open.
Figure 4:
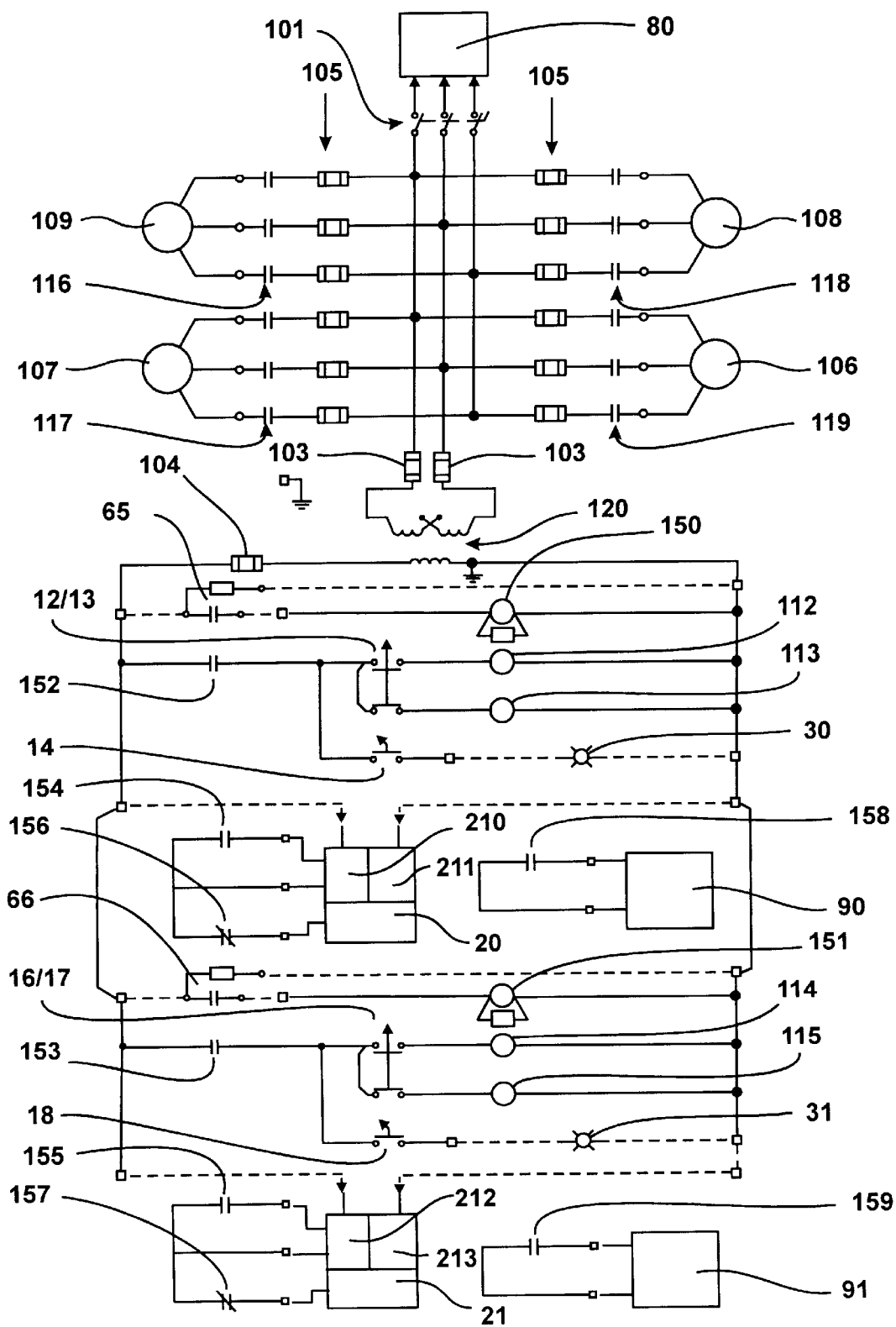
FIG. 4 is a wiring schematic of the 480 Volt, 3 phase loading dock traffic automation and inventory control system of the present invention.

FIGS. 1 through 4 illustrate the 480 Volt, 3 Phase, 60 Hz embodiment of the device of the present invention.

The standard loading dock control panel for electrical dock levelers are usually one single control box system supplied with each individual specific piece of dock leveler equipment. Traditionally, control boxes are made to manually operate one specific piece of equipment. Loading dock fans and loading dock lights usually are supplied with a cord and plug for an electrical outlet.

An advantage of the present invention is to operate loading dock equipment, track shipments and track inventory simultaneously through an automation state with or without a manual process. As a safety feature and energy saver, the manual process must be energized to function by way of the automation process.

The automation dock door equipment process is controlled by a sensing means such as a limit switch, photo eye, motion detector, magnetic switch, or laser. These devices are commercially available and well known in the art. When the dock door is raised the loading dock traffic automation and inventory control panel system is energized and all selector switches are functional. When the dock door is lowered the loading dock traffic and inventory control panel system is de-energized. The selector switches and all functions associated with the selector switches on the control panel are de-energized. If the selector switches had not been previously turned off, when the dock door is lowered the loading dock spot light and loading dock fan are automatically de-energized, thus saving energy.

When the dock door is lowered the dock leveler selector switch is de-energized and is inoperable, preventing damage to the dock door with an unexpected dock leveler operation attempt from an dock worker employee. The device of the present invention automates the loading dock area with a traffic and inventory control panel system 10. The automation process includes an optional truck control notification automation system 90, 91, inside traffic signal dock lights 20, 21, outside traffic signal dock lights 22, 23, loading dock spot lights 30, 31, loading dock fans 40, 41 and electric dock leveler 50, 51.

Supply voltage 80 is applied to loading dock traffic automation and inventory control system 10 by means of common wiring. Said voltage is applied to the circuitry inside loading dock traffic automation and inventory control system 10 by main disconnect switch 101. When the contacts of main disconnect switch 101 are closed, power is delivered to the open contacts 116, 117, 118, 119 of contactors 112, 113, 114, and 115, respectively. Power fuse blocks 105 are provided in series with said supply voltage to provide overcurrent protection. Supply voltage is further applied to transformer 120 via fuses 103. Transformer 120 steps down the voltage to that commonly used by the components served by loading dock traffic automation and inventory control system 10.

Prior to opening overhead dock door 60, 61, switches 12/13, 14, 16/17, and 18 mounted to control panel face 11 are de-energized. When a truck is present at the door opening and overhead dock door 60, 61 is opened, sensing means 65, 66 sends a signal to control relay 150, 151. Sensing means 65, 66 are commercially available devices which signal motion. Examples are an electric eye, motion detector, limit switch, or any common device.

Control relay 150, 151 is energized, closing contacts 152, 153, 154, 155, 158, and 159, and opening contacts 156 and 157. The closure of contacts 152, 153 provides electrical power to switches 12/13, 14, and 16/17, 18, respectively. An operator may now manually actuate any or all of the switches.

Closing contacts 154, 155 and opening contacts 156, 157 causes inside traffic signal dock lights 20, 21 to change color from red to green and outside traffic signal dock lights 22, 23 to change color from green to red. Optionally, an internal transformer and flasher 210, 212 may be provided, which reduces the supply voltage to the inside traffic signal dock lights 20, 21 and outside traffic signal dock lights 22, 23, eliminating the need for a transformer and flasher inside those devices.

Closing contacts 158, 159 provides a power signal to optional external devices 90, 91. For example, these devices could be a truck bar code scanner system or a truck control device such as means to override the truck's transmission, preventing it from being moved while the loading dock door is still open.

Depending on how the loading dock area is configured, any combination of electric or manual dock levelers may be present. In this example, both doors are equipped with electric dock levelers 50, 51. Selector switches 12, 16 are specified as 'Dock leveler/Off/Fan'. Selector switches 12, 16 are three-position spring return left to center momentary contact and lock to right switches. To operate, turn selector switch 12, 16 to the left for a moment. This energizes dock leveler contactors 113, 115. Contacts 117 of dock leveler contactor 113 close, applying power to dock leveler motor 107, turning it on. Likewise, contacts 119 of dock leveler contactor 115 close, applying power to dock leveler motor 106.

When released, the switches spring to center while the dock leveler motors complete their operating duty cycles. In the event a manual loading dock leveler is present at the loading dock, the associated selector switch 12, 16 would not have a dock leveler energize position. Instead, the associated selector switch 13, 17 is a two-position switch with an off position and a fan on position only.

When switch 12, 16 or 13, 17 is turned to the right, fan motor contactor 112, 114 is energized, closing contacts 116, 118, energizing fan motor 109, 108. Selector switches 14, 18 are the loading dock spot light selector switches, which are turned to the right to energize loading dock spot lights 30, 31, respectively, and turned to the left to de-energize loading dock spot lights 30, 31. The selector switches are classified as pilot devices, 30 mm oil tight type, rugged industrial operator that are of a durable one piece casting, silver contacts carry heavy duty ratings. Selector switch has positive action indexing, attractive chrome plating on the locknut and designed to provide long, trouble free service in the most demanding industrial applications. When overhead dock doors 60, 61 are closed, sensing means 65, 66 are triggered, signalling control relays 150, 151. Control relays 150, 151 de-energize, opening contacts 152, 153, 154, 155, 158, and 159, and closing contacts 156 and 157. The opening of contacts 152, 153 removes electrical power from switches 12/13, 14, and 16/17, 18, respectively. This removes power from all devices associated with these switches, and also prevents them from being inadvertently activated, adding to safety and saving energy. Opening contacts 154, 155 and closing contacts 156, 157 causes inside traffic signal dock lights 20, 21 to change color from green to red and outside traffic signal dock lights 22, 23 to change color from red to green.

If an optional inventory control and/or truck control device 90, 91 is installed, opening contacts 158, 159 sends a signal to the optional inventory control and/or truck control device 90, 91.

Control panel enclosure 15 is mounted on the interior wall of the building next to loading dock door 60. One control panel enclosure 15 can service one or two loading dock door areas 70, 75. The left two selector switches 12/13, 14 on control panel face 11 control the left dock door area equipment and the right two selector switches 16/17, 18 on control panel face 11 control the right dock door area equipment. Wall mount enclosure 15 includes internal mounting panel 100 to support all enclosure components.

Control panel 15 includes main disconnect 101 with external operating handle 102 to interrupt power from the incoming 480 Volt, 3 phase power source. Transformer 120, for example 480/120V CPT, is provided to lower supply voltage 80 to the operating voltage associated with devices connected to the traffic and inventory control panel system, such as contactors, relays, loading dock spotlight, and traffic signal dock lights.

Power fuse blocks 105 include fuses in each fuse block to provide a means of individual short circuit protection.

Contactors 116, 117, 118, 119 are rated to operate 480 Volt, 3 phase 60 Hz for ½ horsepower motors 106, 107, 108, and 109. Line terminals 110 are located at the tops of contactors 116, 117, 118, 119 and load terminals 112 at the bottom. Shading coil on the magnet insures positive sealing of the armature. Arc box is made of a glass filled thermoset material to prevent tracking and prevents flashover. Contacts are made of silver cadmium oxide. Fixed mount control relay 150, 151 is supplied to operate the traffic signal dock lights, suitable for industrial use, with high contact reliability.

The device of the present invention includes a surge suppressor on the control relay coil designed to work in conjunction with devices in this control panel.

Control panel 15 of this invention includes terminal block 200 to wire external devices, (sensing means 60, 65, loading dock spotlight 30, 31, traffic signal dock light 20, 21, 22, 23, and optional truck control devices 90, 91).

Terminal block 200 is designed to provide ease of wiring of all external devices to the control panel. Molded material prevents tracking across terminals, large surface area permits ease of screwdriver insertion. There is a clear indication where field wires are installed; white marking strip showing a number for each wire. Screw terminals exist for ease of wiring, and there is a dedicated terminal for each external wire.

Figure 6:
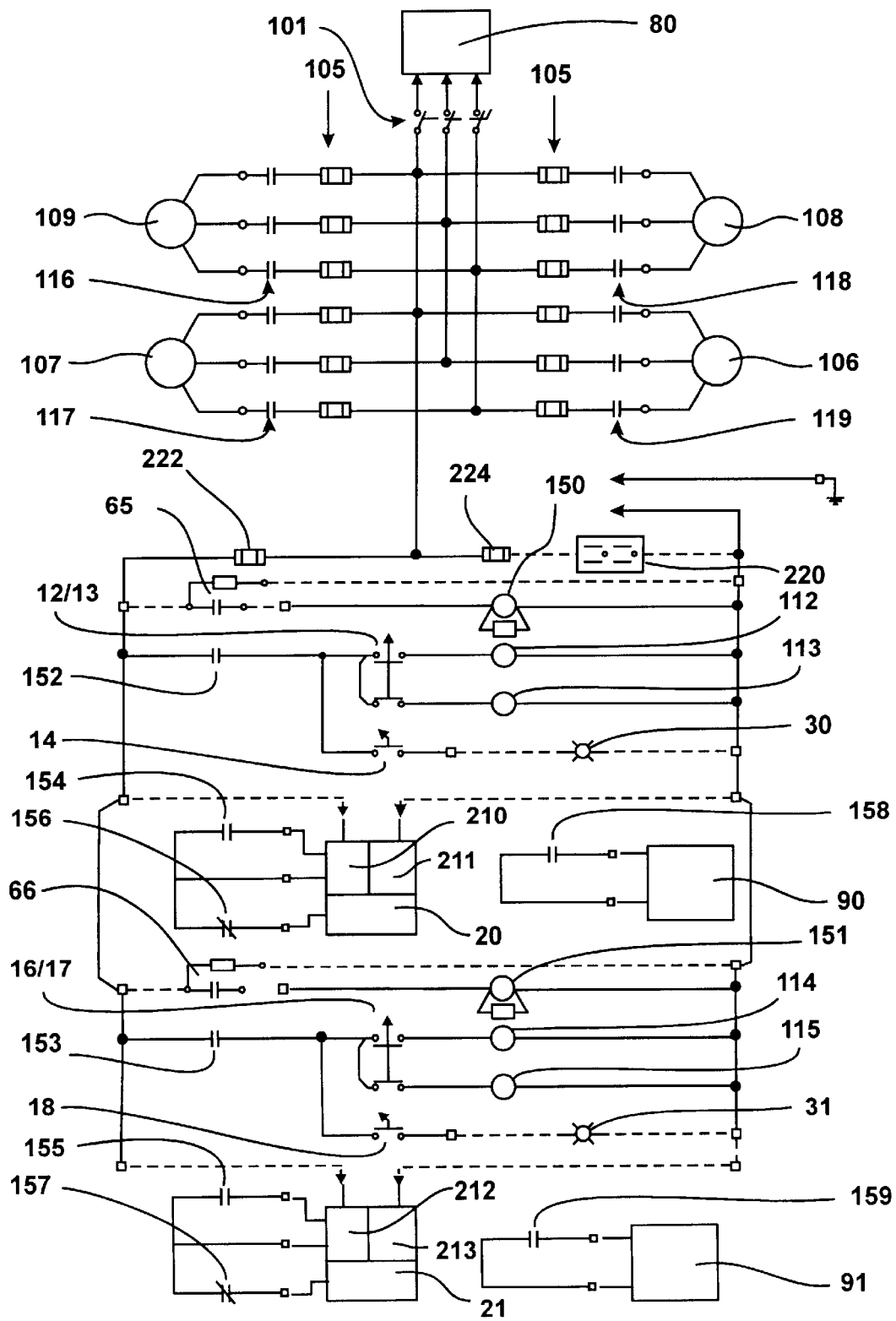
FIG. 6 is a wiring schematic of the 208 Volt, 3 phase loading dock traffic automation and inventory control system of the present invention.
Figure 7:
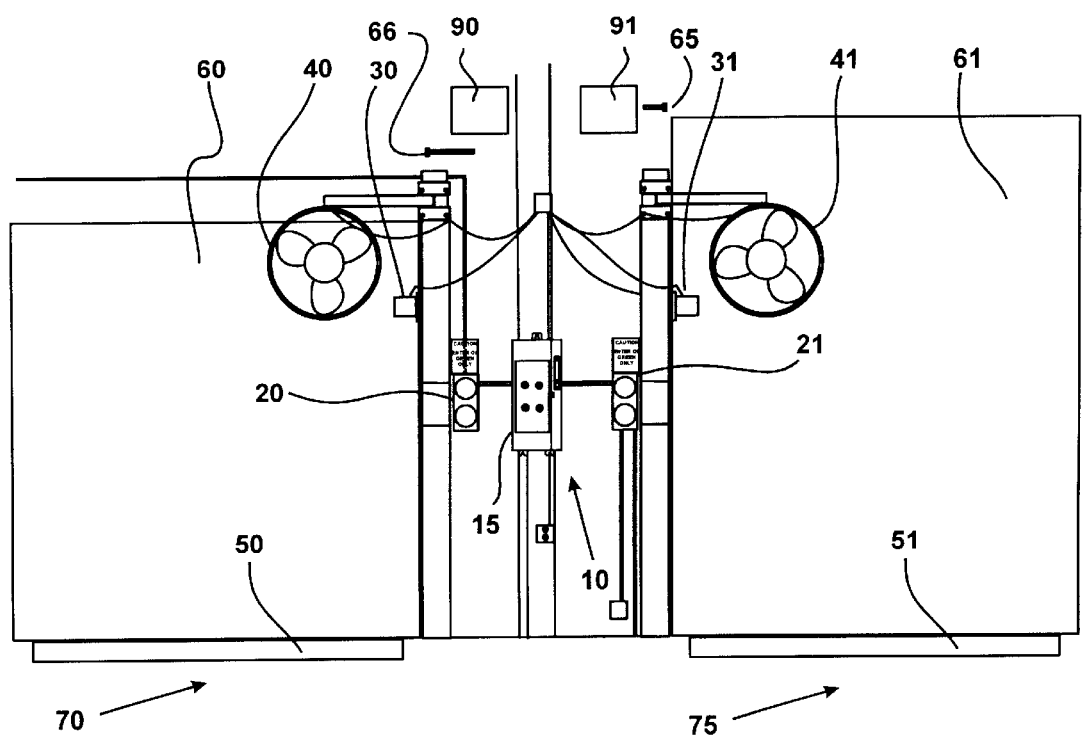
FIG. 7 is a inside frontal view of the loading dock 208 Volt, 3 phase traffic automation and inventory control panel system, traffic signal dock lights, loading dock spot light, loading dock fans mounting and wiring detail of the present invention.

FIGS. 2 and 5 through 7 illustrate the 208 Volt, 3 Phase, 60 Hz embodiment of the device of the present invention.

The standard loading dock control panel for electrical dock levelers are usually one single control box system supplied with each individual specific piece of dock leveler equipment. Traditionally, control boxes are made to manually operate one specific piece of equipment. Loading dock fans and loading dock lights usually are supplied with a cord and plug for an electrical outlet.

An advantage of the present invention is to operate loading dock equipment, track shipments and track inventory simultaneously through an automation state with or without a manual process. As a safety feature and energy saver, the manual process must be energized to function by way of the automation process.

The automation dock door equipment process is controlled by a sensing means such as a limit switch, photo eye, motion detector, magnetic switch, or laser. These devices are commercially available and well known in the art. When the dock door is raised the loading dock traffic automation and inventory control panel system is energized and all selector switches are functional. When the dock door is lowered the loading dock traffic and inventory control panel system is de-energized. The selector switches and all functions associated with the selector switches on the control panel are de-energized. If the selector switches had not been previously turned off, when the dock door is lowered the loading dock spot light and loading dock fan are automatically de-energized, thus saving energy. When the dock door is lowered the dock leveler selector switch is de-energized and is inoperable, preventing damage to the dock door with an unexpected dock leveler operation attempt from an dock worker employee.

The device of the present invention automates the loading dock area with a traffic and inventory control panel system 10. The automation process includes an optional truck control notification automation system 90, 91, inside traffic signal dock lights 20, 21, outside traffic signal dock lights 22, 23, loading dock spot lights 30, 31, loading dock fans 40, 41 and electric dock leveler 50, 51.

Supply voltage 80 is applied to loading dock traffic automation and inventory control system 10 by means of common wiring. Said voltage is applied to the circuitry inside loading dock traffic automation and inventory system 10 by main disconnect switch 101. When the contacts of main disconnect switch 101 are closed, power is delivered to the open contacts 116, 117, 118, 119 of contactors 112, 113, 114, and 115, respectively. Power fuse blocks 105 are provided in series with said supply voltage to provide overcurrent protection. One leg of the three phase supply voltage 80 is applied to the remaining circuitry of the traffic and inventory control panel system 10, via fuses 222, 224. Receptacle 220 is an optional, externally wired device used to provide electrical power for low-current applications such as a radio, bar code scanner, etc.

Prior to opening overhead dock door 60, 61, switches 12/13, 14, 16/17, and 18 mounted to control panel face 11 are de-energized. When a truck is present at the door opening and overhead dock door 60, 61 is opened, sensing means 65, 66 sends a signal to control relay 150, 151. Sensing means 65, 66 are commercially available devices which signal motion. Examples are an electric eye, motion detector, limit switch, or any common device. Control relay 150, 151 is energized, closing contacts 152, 153, 154, 155, 158, and 159, and opening contacts 156 and 157. The closure of contacts 152, 153 provides electrical power to switches 12/13, 14, and 16/17, 18, respectively. An operator may now manually actuate any or all of the switches.

Closing contacts 154, 155 and opening contacts 156, 157 causes inside traffic signal dock lights 20, 21 to change color from red to green and outside traffic signal dock lights 22, 23 to change color from green to red. Optionally, an internal transformer and flasher 210, 212 may be provided, which reduces the supply voltage to the inside traffic signal dock lights 20, 21 and outside traffic signal dock lights 22, 23, eliminating the need for a transformer and flasher inside those devices.

Closing contacts 158, 159 provides a power signal to optional external devices 90, 91. For example, these devices could be a truck bar code scanner system or a truck control device such as means to override the truck's transmission, preventing it from being moved while the loading dock door is still open.

Depending on how the loading dock area is configured, any combination of electric or manual dock levelers may be present. In this example, both doors are equipped with electric dock levelers 50, 51. Selector switches 12, 16 are specified as 'Dock leveler/Off/Fan'. Selector switches 12, 16 are three-position spring return left to center momentary contact switches. To operate, turn selector switch 12, 16 to the left for a moment. This energizes dock leveler contactors 113, 115. Contacts 117 of dock leveler contactor 113 close, applying power to dock leveler motor 107, turning it on. Likewise, contacts 119 of dock leveler contactor 115 close, applying power to dock leveler motor 106. When released, the switches spring to center while the dock leveler motors complete their operating duty cycles. In the event a manual loading dock leveler is present at the loading dock, the associated selector switch 12, 16 would not have a dock leveler energize position. Instead, the associated selector switch 13, 17 is a two-position switch with an off position and a fan on position only.

When switch 12, 16 or 13, 17 is turned to the right, fan motor contactor 112, 114 is energized, closing contacts 116, 118, energizing fan motor 109, 108. Selector switches 14, 18 are the loading dock spot light selector switches, which are turned to the right to energize loading dock spot lights 30, 31, respectively, and turned to the left do de-energize loading dock spot lights 30, 31. The selector switches are classified as pilot devices, 30 mm oil tight type, rugged industrial operator that are of a durable one piece casting, silver contacts carry heavy duty ratings. Selector switch has positive action indexing, attractive chrome plating on the locknut and designed to provide long, trouble free service in the most demanding industrial applications.

When overhead dock doors 60, 61 are closed, sensing means 65, 66 are triggered, signalling control relays 150, 151. Control relays 150, 151 de-energize, opening contacts 152, 153, 154, 155, 158, and 159, and closing contacts 156 and 157. The opening of contacts 152, 153 removes electrical power from switches 12/13, 14, and 16/17, 18, respectively. This removes power from all devices associated with these switches, and also prevents them from being inadvertently activated, adding to safety and saving energy. Opening contacts 154, 155 and closing contacts 156, 157 causes inside traffic signal dock lights 20, 21 to change color from green to red and outside traffic signal dock lights 22, 23 to change color from red to green. If an optional inventory control and/or truck control device 90, 91 is installed, opening contacts 158, 159 sends a signal to the optional inventory control and/or truck control device 90, 91.

Control panel enclosure 15 is mounted on the interior wall of the building next to loading dock door 60. One control panel enclosure 15 can service one or two loading dock door areas 70, 75. The left two selector switches 12/13, 14 on control panel face 11 control the left dock door area equipment and the right two selector switches 16/17, 18 on control panel face 11 control the right dock door area equipment. Wall mount enclosure 15 includes internal mounting panel 100 to support all enclosure components.

Control panel 15 includes main disconnect 101 with external operating handle 102 to interrupt power from the incoming 208 Volt, 3 phase power source. Power fuse blocks 105 include fuses in each fuse block to provide a means of individual short circuit protection.

Contactors 116, 117, 118, 119 are rated to operate 208 Volt, 3 phase 60 Hz for motors 106, 107, 108, and 109. Line terminals 110 are located at the tops of contactors 116, 117, 118, 119 and load terminals 112 at the bottom. Shading coil on the magnet insures positive sealing of the armature. Arc box is made of a glass filled thermoset material to prevent tracking and prevents flashover. Contacts are made of silver cadmium oxide. Fixed mount control relay 150, 151 is supplied to operate the traffic signal dock lights, suitable for industrial use, with high contact reliability. The device of the present invention includes a surge suppressor on the control relay coil designed to work in conjunction with devices in this control panel.

Control panel 15 of this invention includes terminal block 200 to wire external devices, (sensing means 60, 65, loading dock spotlight 30, 31, traffic signal dock light 20, 21, 22, 23, and optional truck control devices 90, 91). Terminal block 200 is designed to provide ease of wiring of all external devices to the control panel. Molded material prevents tracking across terminals, large surface area permits ease of screwdriver insertion. There is a clear indication where field wires are installed; white marking strip showing a number for each wire. Screw terminals exist for ease of wiring, and there is a dedicated terminal for each external wire.

Figure 8A:
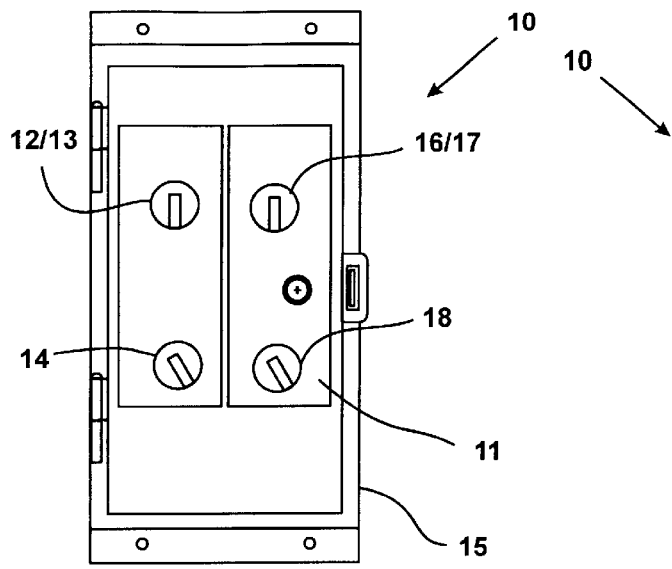
FIG. 8A is a frontal view of the 120 Volt, 1 phase loading dock traffic automation and inventory control panel system of the present invention showing the front door closed.
Figure 8B:
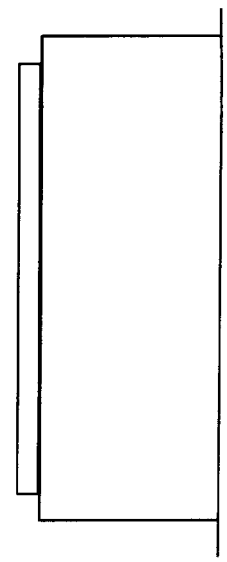
FIG. 8B is a side view of the 120 Volt, 1 phase loading dock traffic automation and inventory control panel system of the present invention.
Figure 8D:
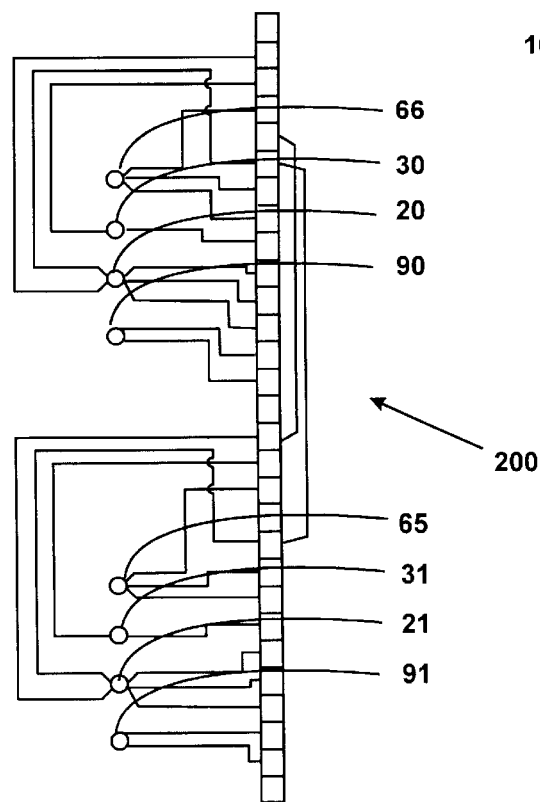
FIG. 8D is an illustration of the terminal strip installed in the 120 Volt, 1 phase embodiment of the present invention.
Figure 8C:
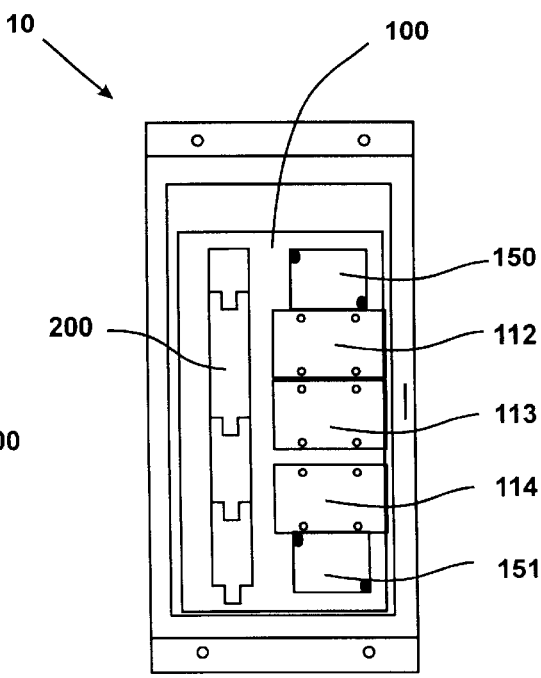
FIG. 8C is a frontal view of the 120 Volt, 1 phase loading dock traffic automation and inventory control panel system of the present invention showing the front door open.
Figure 9:
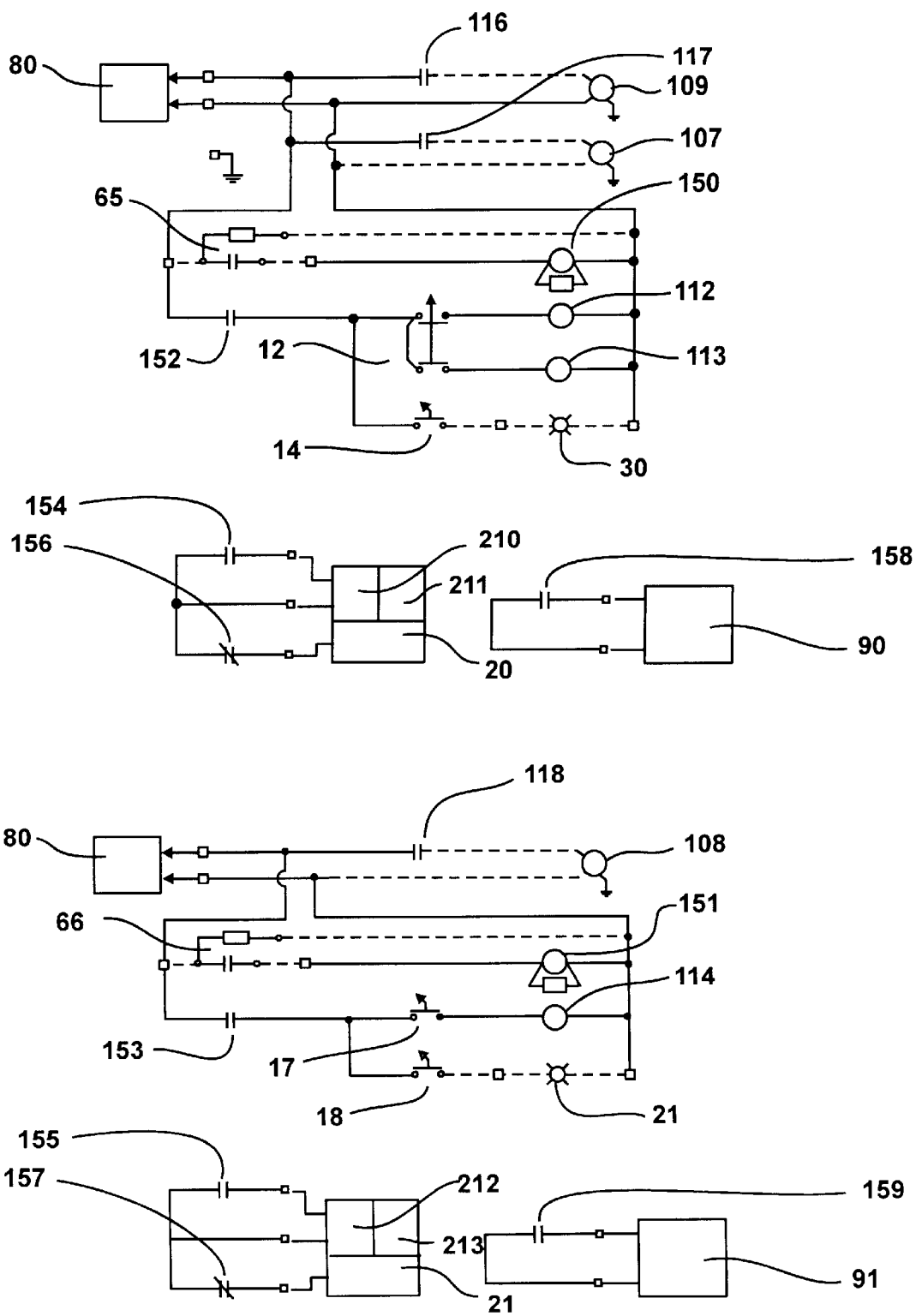
FIG. 9 is a wiring schematic of the 120 Volt, 1 phase loading dock traffic automation and inventory control system of the present invention.
Figure 10:
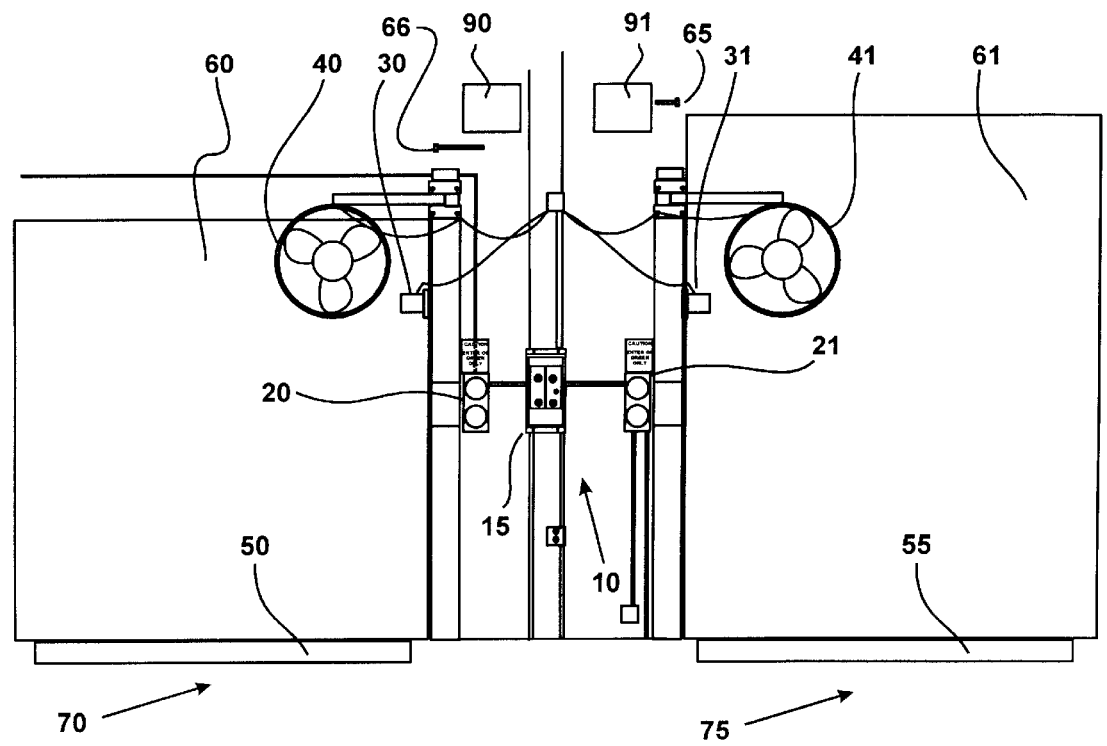
FIG. 10 is a inside frontal view of the 120 Volt, 1 phase loading dock traffic automation and inventory control panel system, traffic signal dock lights, loading dock spot light, loading dock fans mounting and wiring detail of the present invention.

FIGS. 2 and 8 through 10 illustrate the 120 Volt, single phase, 60 Hz embodiment of the device of the present invention. This embodiment concerns a situation when only one electric dock leveler is present. The standard loading dock control panel for electrical dock levelers are usually one single control box system supplied with each individual specific piece of dock leveler equipment. Traditionally, control boxes are made to manually operate one specific piece of equipment.

Loading dock fans and loading dock lights usually are supplied with a cord and plug for an electrical outlet.

An advantage of the present invention is to operate loading dock equipment, track shipments and track inventory simultaneously through an automation state with or without a manual process. As a safety feature and energy saver, the manual process must be energized to function by way of the automation process.

The automation dock door equipment process is controlled by a sensing means such as a limit switch, photo eye, motion detector, magnetic switch, or laser. These devices are commercially available and well known in the art. When the dock door is raised the loading dock traffic automation and inventory control panel system is energized and all selector switches are functional. When the dock door is lowered the loading dock traffic and inventory control panel system is de-energized. The selector switches and all functions associated with the selector switches on the control panel are de-energized. If the selector switches had not been previously turned off, when the dock door is lowered the loading dock spot light and loading dock fan are automatically de-energized, thus saving energy. When the dock door is lowered the dock leveler selector switch is de-energized and is inoperable, preventing damage to the dock door with an unexpected dock leveler operation attempt from an dock worker employee.

The device of the present invention automates the loading dock area with a traffic and inventory control panel system 10. The automation process includes an optional truck control notification automation system 90, 91, inside traffic signal dock lights 20, 21, outside traffic signal dock lights 22, 23, loading dock spot lights 30, 31, loading dock fans 40, 41 and electric dock leveler 50, 51.

Supply voltage 80 is applied to loading dock traffic automation and inventory control system 10 by means of common wiring. Said voltage is applied to the open contacts 116, 117, 118 of contactors 112, 113, and 114, respectively. Prior to opening overhead dock door 60, 61, switches 12/13, 14, 16/17, and 18 mounted to control panel face 11 are de-energized. When a truck is present at the door opening and overhead dock door 60, 61 is opened, sensing means 65, 66 sends a signal to control relay 150, 151. Sensing means 65, 66 are commercially available devices which signal motion. Examples are an electric eye, motion detector, limit switch, or any common device. Control relay 150, 151 is energized, closing contacts 152, 153, 154, 155, 158, and 159, and opening contacts 156 and 157. The closure of contacts 152, 153 provides electrical power to switches 12/13, 14, and 16/17, 18, respectively. An operator may now manually actuate any or all of the switches.

Closing contacts 154, 155 and opening contacts 156, 157 causes inside traffic signal dock lights 20, 21 to change color from red to green and outside traffic signal dock lights 22, 23 to change color from green to red. Optionally, an internal transformer and flasher 210, 212 may be provided, which reduces the supply voltage to the inside traffic signal dock lights 20, 21 and outside traffic signal dock lights 22, 23, eliminating the need for a transformer and flasher inside those devices.

Closing contacts 158, 159 provides a power signal to optional external devices 90, 91. For example, these devices could be a truck bar code scanner system or a truck control device such as means to override the truck's transmission, preventing it from being moved while the loading dock door is still open.

Depending on how the loading dock area is configured, any combination of electric or manual dock levelers may be present. In this example, only one door is equipped with an electric dock leveler 50.

The second door 61 is equipped with manual dock leveler 55. Selector switch 12 is specified as 'Dock leveler/Off/Fan'. Selector switch 12 is a three-position spring return left to center momentary contact switch. To operate, turn selector switch 12 to the left for a moment. This energizes dock leveler contactor 113. Contacts 117 of dock leveler contactor 113 close, applying power to dock leveler motor 107, turning it on. When released, the switch springs to center while the dock leveler motor complete its operating duty cycle. In the event a manual loading dock leveler is present at the loading dock, the associated selector switch 12, 16 would not have a dock leveler energize position. Instead, the associated selector switch 13, 17 is a two-position switch with an off position and a fan on position only.

When switch 12, 17 is turned to the right, fan motor contactor 112, 114 is energized, closing contacts 116, 118, energizing fan motor 109, 108. Selector switches 14, 18 are the loading dock spot light selector switches, which are turned to the right to energize loading dock spot lights 30, 31, respectively, and turned to the left do de-energize loading dock spot lights 30, 31. The selector switches are classified as pilot devices, 30 mm oil tight type, rugged industrial operator that are of a durable one piece casting, silver contacts carry heavy duty ratings. Selector switch has positive action indexing, attractive chrome plating on the locknut and designed to provide long, trouble free service in the most demanding industrial applications. When overhead dock doors 60, 61 are closed, sensing means 65, 66 are triggered, signalling control relays 150, 151.

Control relays 150, 151 de-energize, opening contacts 152, 153, 154, 155, 158, and 159, and closing contacts 156 and 157. The opening of contacts 152, 153 removes electrical power from switches 12/13, 14, and 16/17, 18, respectively. This removes power from all devices associated with these switches, and also prevents them from being inadvertently activated, adding to safety and saving energy. Opening contacts 154, 155 and closing contacts 156, 157 causes inside traffic signal dock lights 20, 21 to change color from green to red and outside traffic signal dock lights 22, 23 to change color from red to green. If an optional inventory control and/or truck control device 90, 91 is installed, opening contacts 158, 159 sends a signal to the optional inventory control and/or truck control device 90, 91.

Control panel enclosure 15 is mounted on the interior wall of the building next to loading dock door 60. One control panel enclosure 15 can service one or two loading dock door areas 70, 75. The left two selector switches 12/13, 14 on control panel face 11 control the left dock door area equipment and the right two selector switches 16/17, 18 on control panel face 11 control the right dock door area equipment. Wall mount enclosure 15 includes internal mounting panel 100 to support all enclosure components.

Contactors 116, 117, 118 are rated to operate 120 Volt, single phase 60 Hz for motors 107, 108, and 109. Line terminals 110 are located at the tops of contactors 116, 117, 118 and load terminals 112 at the bottom. Shading coil on the magnet insures positive sealing of the armature. Arc box is made of a glass filled thermoset material to prevent tracking and prevents flashover. Contacts are made of silver cadmium oxide. Fixed mount control relay 150, 151 is supplied to operate the traffic signal dock lights, suitable for industrial use, with high contact reliability.

The device of the present invention includes a surge suppressor on the control relay coil designed to work in conjunction with devices in this control panel.

Control panel 15 of this invention includes terminal block 200 to wire external devices, (sensing means 60, 65, loading dock spotlight 30, 31, traffic signal dock light 20, 21, 22, 23, and optional truck control devices 90, 91). Terminal block 200 is designed to provide ease of wiring of all external devices to the control panel. Molded material prevents tracking across terminals, large surface area permits ease of screwdriver insertion. There is a clear indication where field wires are installed; white marking strip showing a number for each wire. Screw terminals exist for ease of wiring, and there is a dedicated terminal for each external wire.

What is claimed is:

1. A loading dock traffic automation and inventory control system comprising:

A truck control notification automation system;

At least one outside traffic signal dock light mounted outside of the loading dock doors At least one inside traffic signal dock light mounted inside of the loading dock door;

At least one dock leveler and an overhead door;

Sensing means for sensing the movement of said overhead door; and

Said electrical control system, which includes selector switches for manually operating at least one of said dock leveler, to be electrically fed by at least one power source and is coupled to said at least one inside and outside traffic signal dock light said dock leveler, said sensing means and said truck control notification automation system;

Wherein said selector switches are energized with full automation and are now operable when said overhead door is raised and sensed by said sensing means and are de-energized and are inoperable when said overhead door is lowered or in closed position;

When said selector switches are energized while the overhead door is raised, at least one outside traffic signal dock light automatically changes color; and said at least one outside traffic signal dock light automatically changes color and both changed color of said outside and inside dock lights are always different color from each other, and said selector switches are deenergized when the overhead door is lowered.

2. A loading dock traffic automation and inventory control system according to claim 1 wherein the power source is selected from 480 Volt, 3 phase; 208 Volt, 3 Phase; and 120 V, 1 phase electricity.

3. A loading dock traffic automation and inventory control system according to claim 1 wherein said sensing means comprises sensing means selected from a limit switch, photo eye, magnetic switch, and a laser.

4. A loading dock traffic automation and inventory control system according to claim 1 including at least one loading dock spot light and loading dock fan, wherein said electrical system is electrically coupled to said spot light and dock fan, and wherein said selector switches also for manually operating said spot light and dock fan.

5. A loading dock traffic automation and inventory control system according to claim 4 wherein said selector switches for the dock leveler, loading dock fan and loading dock spot light are inoperable when the loading dock door is in the down and closed position.

6. A loading dock traffic automation and inventory control system according to claim 4 wherein said sensing means are triggered and activated by loading dock door motion and energizing the selector switches located in said loading dock traffic automation and inventory control system enclosure for the dock leveler, loading dock fan and loading dock spot light.

7. A loading dock traffic automation and inventory control system according to claim 6 wherein said dock leveler and loading dock fan selector switch operates with one selector switch.

8. A loading dock traffic automation and inventory control system according to claim 7 wherein said dock leveler operates by turning the selector switch as a momentary contact to the left as on and is spring center off, said loading dock fan operates as lock on to the right and center off.

9. A loading dock traffic automation and inventory control system according to claim 8 wherein said loading dock spot light selector switch operates lock on to the right and lock off to the left.

10. A loading dock traffic automation and inventory control system according to claim 4 wherein all selector switches in the control panel are energized and operable only when the loading dock door is raised.

11. A loading dock traffic automation and inventory control system according to claim 10 wherein as the loading dock door is lowered with said selector switches are selected with the on energized position, the dock leveler and loading dock fan selector switch the loading dock spot light selector switch all become de-energized and inoperable.

12. A loading dock traffic automation and inventory control system according to claim 11 wherein the dock leveler, loading dock fan and loading dock spot light all turn off.

13. A loading dock traffic automation and inventory control system according to claim 1 wherein said electrical control panel enclosure is mounted on the interior wall of the building next to the loading dock door.

14. A loading dock traffic automation and inventory control system according to claim 13 wherein said electrical control panel enclosure includes electrical means for servicing one or two loading dock doors.

15. A loading dock traffic automation and inventory control system according to claim 14 wherein said electrical control panel enclosure includes information on a face panel on the outside front for easy operating instructions.

16. A loading dock traffic automation and inventory control system according to claim 15 wherein said electrical control panel enclosure includes at least one a tenninal strip for easy wire hookup.

17. A loading dock traffic automation and inventory control system according to claim 1, wherein said inside traffic signal dock lights automatically change from red to green and said outside traffic signal dock lights automatically change from green to red as the loading door is raised.

18. A loading dock traffic automation and inventory control system according to claim 1, wherein inside traffic signal dock lights automatically change from green to red and the outside traffic signal dock lights automatically change from red to green as the loading door is lowered.

19. A loading dock traffic automation and inventory control system according to claim 1 wherein said inside traffic signal dock light colors are always opposite from the outside traffic signal dock lights.

20. A loading dock traffic automation and inventory control system according to claim 1 wherein said sensing means senses a truck has entered a sensing zone in front of the loading dock and electrically responds inside and outside the building.

21. A loading dock traffic automation and inventory control system according to claim 1 wherein a computer database network inside the building is notified when a truck has backed up to the dock.

22. A loading dock traffic automation and inventory control system according to claim 21 wherein said computer database network recognizes movement of any truck in front of a specific dock.

23. A loading dock traffic automation and inventory control system according to claim 22 wherein said sensing means activates an alarm if a truck prematurely pulls away from the dock when said dock door is not closed.

24. A loading dock traffic automation and inventory control system according to claim 21 including means for barcode reading the truck for at least one of traffic control management, delivery time management, inventory control and loss prevention.

25. A loading dock traffic automation and inventory control system according to claim 21 wherein said sensing means activates (RFI) radio frequency identification.

26. A loading dock traffic automation and inventory control system according to claim 21 wherein said sensing means activates (SAW) surface acoustic wave technology.

27. A loading dock traffic automation and inventory control system according to claim 1 wherein said sensing means will signal and alert the truck driver with one or more of the following devices: a warning beacon strobe located in the cab of the truck; a warning beacon strobe located on the truck; the truck horn is activated; the transmission of the truck is locked; the brakes of the truck are locked; an independent signal warning device in front of the truck is activated; the truck driver is notified on his truck radio, the truck driver is notified on his phone, pager, radio or other communication devices; and/or an audio alarm inside the cab of the truck is activated.

28. A loading dock traffic automation and inventory control system according to claim 1 including sensing means which notifies a dock attendant inside the truck trailer of unauthorized truck movement by means of a safety alarm light inside the truck trailer, and/or an audio alarm inside the truck trailer.

29. A loading dock traffic automation and inventory control system according to claim 1 wherein said sensing means notifies a forklift driver of unauthorized truck movement by means of a beacon alarm; a strobe on a forklift; an audio alarm on the forklift; and/or the phone, pager, radio or other communication devices.

30. A loading dock traffic automation and inventory control system according to claim 1 wherein as the loading dock door is lowered, the truck control notification automation system automates a reverse signal and all alarm warning notices to the truck, truck driver, loading dock worker and forklift driver are reversed.

31. A loading dock traffic automation and inventory control system according to claim 1 wherein a traffic signal dock light step down transformer is installed inside the loading dock traffic automation and inventory control system.

32. A loading dock traffic automation and inventory control panel system according to claim 1 wherein the traffic signal dock lights are installed inside the loading dock traffic automation and inventory control panel, thus eliminating the inside traffic signal dock light.

33. A loading dock traffic notification and inventory control system comprising:

A loading dock including an overhead door, a loading zone, at least one indicator means, a sensing means and a truck control notification automation system;

wherein said truck control notification automation system includes a computer database network;

wherein said sensing means includes means for sensing if a truck has entered the loading zone in front of the loading dock, and the movement/position status of said overhead door;

wherein said notification system includes a notification means for notifying dock attendants inside the building when a truck has backed up to the dock and is sensed by said sensing means;

wherein said computer database network records the movement of any truck in front of a specific dock;

wherein said notification system includes at least one of radio frequency identification (RFID); surface acoustic wave device (SAW); a barcode reader means for reading barcodes on the truck;

whereby as the loading dock door is raised and lowered as sensed by the sensing means, the truck control notification automation system automatically updates the computer traffic database in order to record the data of the traffic, delivery time, and inventory by activating at least one of said RFID, SAW and barcode reader means to obtain said data; and to activate an alarm signal on said indicator means to notify the truck driver that he cannot depart, when the locking door is raised and to activate an free signal on said indicator means to notifying the truck driver that he may depart now when the locking door is lowered.

34. A loading dock traffic automation and inventory control panel system according to claims 33 including means for barcode reading, RFID reading, SAW reading or any other real time visibility of the products on the truck or information on inventory of goods.

35. A loading dock traffic automation and inventory control panel system according to claim 34 wherein said sensing means activates (RFID) radio frequency identification means located inside or outside said building to facilitate loading and unloading in the loading dock area.

36. A loading dock traffic automation and inventory control panel system according to claim 33 wherein said sensing means activates (SAW) a surface acoustic wave system located inside or adjacent said building.

* * * * *